United States Patent
Takahashi et al.

(10) Patent No.: US 6,430,451 B1
(45) Date of Patent: *Aug. 6, 2002

(54) CONTROL SYSTEM FOR APPARATUS REPAIR INFORMATION

(75) Inventors: Kazuo Takahashi; Masatoshi Tachibana; Tetsuo Fukumoto, all of Hino (JP)

(73) Assignee: Konica Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/259,651

(22) Filed: Feb. 26, 1999

(30) Foreign Application Priority Data

Mar. 6, 1998 (JP) .............................................. 10-054559

(51) Int. Cl.⁷ ............................................... G05B 13/02
(52) U.S. Cl. .......................................... 700/3; 700/275
(58) Field of Search ................................. 700/110, 180, 700/181, 182, 2, 17, 9, 159, 169, 174, 275, 3, 105, 108; 707/202, 207; 706/52, 45

(56) References Cited

U.S. PATENT DOCUMENTS

| | | | | |
|---|---|---|---|---|
| 4,872,121 A | * | 10/1989 | Chan et al. | 364/551.01 |
| 5,025,391 A | * | 6/1991 | Filby et al. | 706/45 |
| 5,309,351 A | * | 5/1994 | McCain et al. | 700/3 |
| 5,311,562 A | * | 5/1994 | Palusamy et al. | 376/215 |
| 5,374,813 A | * | 12/1994 | Shipp | 235/375 |
| 5,657,245 A | * | 8/1997 | Hecht et al. | 700/287 |
| 5,724,261 A | * | 3/1998 | Denny et al. | 700/83 |
| 5,854,994 A | * | 12/1998 | Canada et al. | 702/56 |
| 5,877,961 A | * | 3/1999 | Moore | 700/180 |
| 6,076,083 A | * | 6/2000 | Baker | 706/52 |

* cited by examiner

Primary Examiner—Leo Picard
Assistant Examiner—Kidest Bahta
(74) Attorney, Agent, or Firm—Bierman, Muserlian and Lucas

(57) ABSTRACT

A machine repair information administering apparatus for administering information concerning repair for plural kinds of machines, is provided with a receiving device for receiving the information concerning repair for a machine, a memory for classifying and memorizing the information concerning repair for the machine for each kind of the machine; and a transmitting device for transmitting the information concerning repair for the machine which is memorized by the memory.

6 Claims, 9 Drawing Sheets

CONTROL SYSTEM FOR APPARATUS REPAIR INFORMATION

BACKGROUND OF THE INVENTION

This invention relates to a control system for apparatus repair information which makes maintenance and inspection easy.

An apparatus requiring maintenance and inspection, for example, such as an automatic developing apparatus, a printer, and a laser imager is installed in a medical institution such as a hospital, an office and so forth. The maintenance and inspection of such apparatus is carried out by a serviceman on the occasion of receiving information of a trouble or in a periodical patrol.

In some cases, a fairly skilled serviceman can carry out the maintenance and inspection by finding out the cause of the trouble and the points of the trouble from the condition of the operation or the situation of the trouble of the apparatus; however, in other cases, for some servicemen or for some troubles, a repair manual must be relied on.

Incidentally, apparatus are becoming more and more of high precision, made complex, and multi-functioned, and the number of pages of the repair manual has been increased accordingly, so that a serviceman should take much trouble in opening the pertinent page; thus, it has been difficult to cope with the request of users sufficiently.

Further, some troubles are easy to occur in certain apparatus; therefore, if these troubles can be foreseen and if it can be found out how the repair should be made corresponding to the troubles, the maintenance and inspection can be carried out quickly and easily.

SUMMARY OF THE INVENTION

This invention has been done in view of the above-mentioned real situation, and it is an object of it to provide a control system for apparatus repair information which makes it possible to carry out the maintenance and inspection of apparatus quickly and easily.

In order to solve the above-mentioned problem and to accomplish the object, this invention has been made to have a structure described in the following:

A administering apparatus for apparatus repair information for administering the information concerning repair of apparatus, comprising receiving means for receiving said information concerning repair of apparatus, memorizing means for classifying and memorizing said information concerning repair of apparatus received by said receiving means for each kind of said apparatus, and transmitting means for transmitting said information concerning repair for each kind of said apparatus.

An administering system for apparatus repair information for administering the information concerning repair of apparatus, comprising receiving means for receiving said information concerning repair of apparatus, memorizing means for classifying and memorizing said information concerning repair of apparatus received by said receiving means for each kind of said apparatus, and transmitting means for transmitting said information concerning repair for each kind of said apparatus.

Further, the above-mentioned object is accomplished also by any one of the favorable structures described in the following:

(1) A control system for apparatus repair information for controlling the information concerning repair of apparatus comprising means for receiving the information concerning repair of a plurality of kinds of apparatus transmitted through a communication line, and memorizing means for memorizing this information concerning repair of a plurality of kinds of apparatus received by said receiving means for each kind of apparatus, further comprising transmitting means capable of transmitting said information concerning repair for each kind of apparatus memorized by said memorizing means through a communication line.

According to the invention set forth in the paragraph (1), by receiving the information concerning repair of a plurality of kinds of apparatus transmitted through a communication line, memorizing this received information concerning repair of a plurality of kinds of apparatus for each kind of apparatus, and transmitting said memorized information concerning repair for each kind of apparatus through a communication line, the troubles which are easy to occur in respective apparatus can be foreseen, and it can be found out how the repair is to be done corresponding to the troubles, because the information concerning repair of apparatus is commonly utilized when repair of apparatus is made; hence, the maintenance and inspection can be quickly and easily carried out.

(2) A control system for apparatus repair information set forth in the paragraph (1) wherein the aforesaid information concerning repair of apparatus memorized for each kind of apparatus is memorized in relation to the information concerning the portions and/or the parts of apparatus which is memorized beforehand for each kind of apparatus.

According to this invention described in the paragraph (2), by relating the information concerning the repair of apparatus memorized for each kind of apparatus to the information concerning the portions and/or the parts of apparatus memorized beforehand for each kind of apparatus, the troubles which are easy to occur for respective apparatus can be foreseen and it is found out how the repair should be made corresponding to the troubles on the basis of the information concerning how in which apparatus, which portions and/or which parts have been repaired, so that the maintenance and inspection may be carried out quickly and easily.

(3) A control system for apparatus repair information set forth in the paragraph (2) wherein the aforesaid information concerning the repair for each kind of apparatus memorized by the aforesaid memorizing means can be transmitted by the aforesaid transmitting means through a communication line, in a condition that it is related to the aforesaid information concerning the portions and/or the parts of apparatus memorized beforehand for each kind of apparatus.

According to this invention described in the paragraph (3), when the repair of the portion and/or the parts of an apparatus is going to be done, the apparatus repair information can be transmitted to the apparatus side, in a condition that the information concerning repair of apparatus memorized for each kind of apparatus is related to the information concerning the portions and/or the parts of apparatus memorized beforehand for each kind of apparatus.

DETAILED DESCRIPTION OF THE PREFERRED EMBODIMENT

In the following, the embodiment of the control system for apparatus repair information of this invention will be explained in detail with reference to the drawings.

Figure 1:
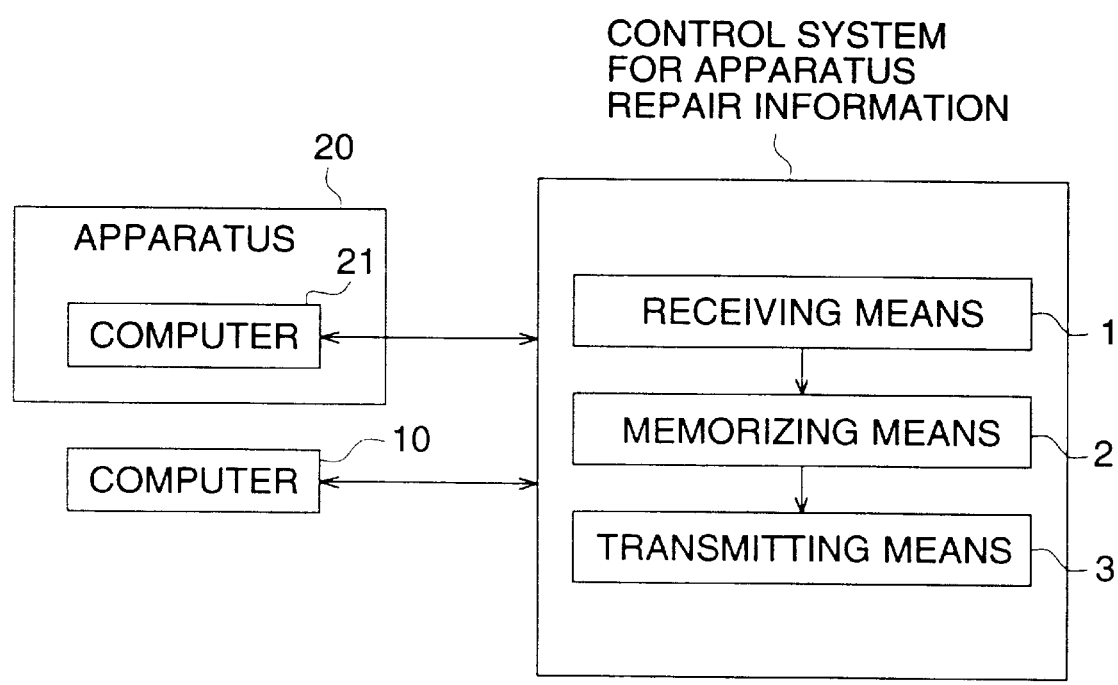
FIG. 1 is a drawing showing the outline of a control system for apparatus repair information.

FIG. 1 is a drawing showing the outline of a control system for apparatus repair information.

As shown in FIG. 1, this control system for apparatus repair information comprises the receiving means 1 for receiving the information concerning repair of a plurality of kinds of apparatus transmitted through a communication line (A telephone line or the like can be available, and both wire and wireless one will do well.), the memorizing means 2 for memorizing the information concerning repair of a plurality of kinds of apparatus received by this receiving means 1 for each kind of apparatus, and the transmitting means 3 capable of transmitting the information concerning repair for each kind of apparatus memorized by the memorizing means 2 to the apparatus side through a communication line. This control system for apparatus repair information carries out information give-and-take with the computer 10 or the computer 21 provided in the apparatus 20.

Figure 2:
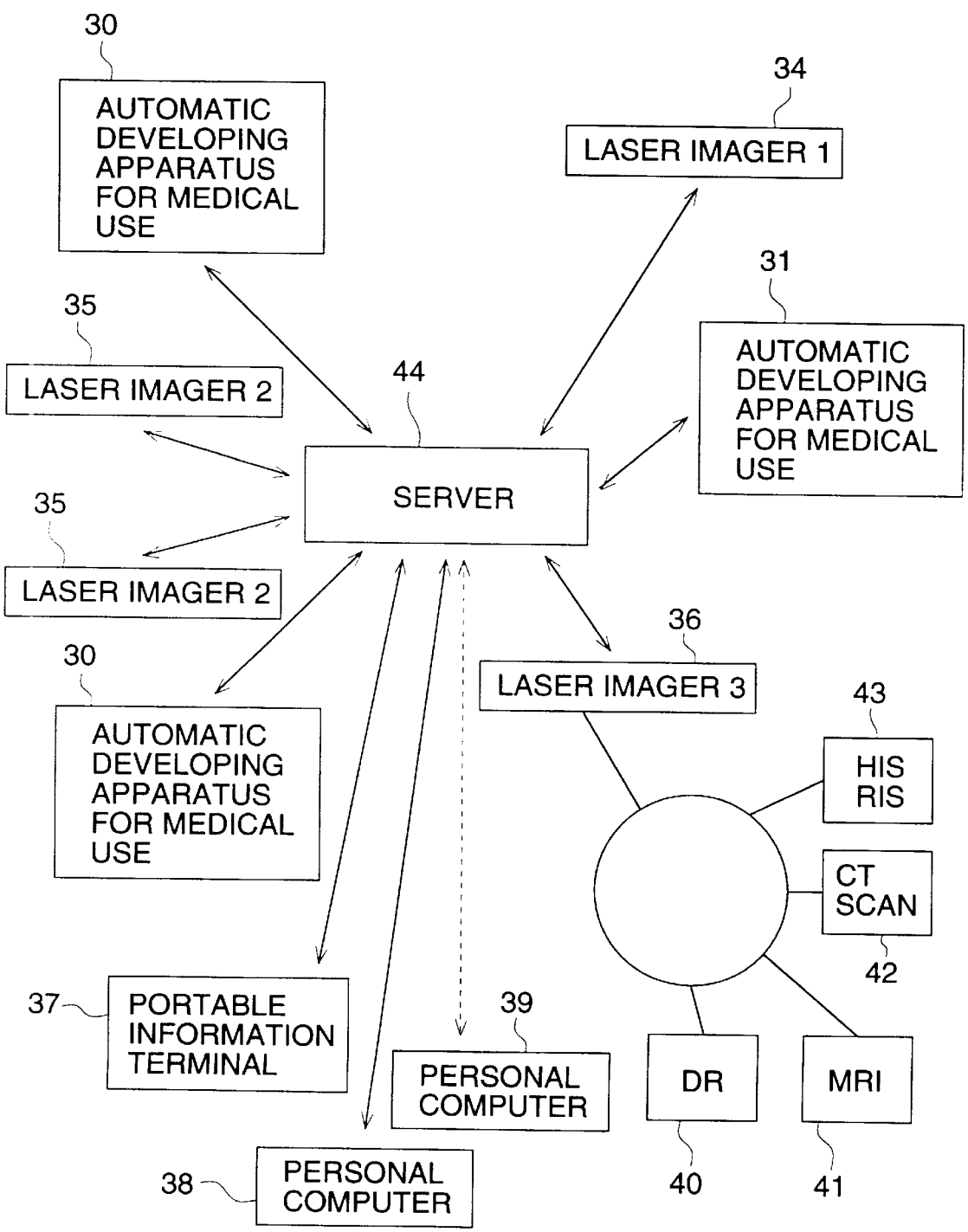
FIG. 2 is a drawing showing the outline of the structure wherein the control system for apparatus repair information is applied to the repair of medical equipment.

FIG. 2 is a drawing showing the outline of the structure wherein the control system is applied to medical equipment. In addition, it is shown herein an example in which the system is applied to medical equipment, however, the invention is not confined to this. Medical equipment means literally equipment used in medical service. For example, a laser imager for medical use, an automatic developing apparatus for medical use, a CT scan apparatus, an MRI apparatus, a digital radiography apparatus, and so forth can be cited.

The control apparatus or system for apparatus repair information of this embodiment is the one for controlling the information concerning repair of medical apparatus; the apparatus, for example, two automatic developing apparatus for medical use of the same kind 30, the automatic developing apparatus of another kind 31, the laser imagers 34 and 35, the HIS apparatus, the RIS apparatus 43, the CT scan apparatus 42, the MRI apparatus 41, the laser imager 36 connected to the network 44 having the digital radiography apparatus 40, the personal computer 38, the portable information terminal 37, and so forth are capable of transmitting and receiving information to and from the server 44 which is the control apparatus for apparatus repair information. Of course, it may be appropriate that they are made to be capable of being connected and disconnected to and from the server. Further, the personal computer 39 is not connected to the server, but carries out give-and-take of information with it through an information recording medium such as a floppy disk and a Zip. In addition, in this embodiment, the control apparatus for apparatus repair information is the server 44. Furthermore, the control system for apparatus repair information has only to comprise at least the server 44; thus, the server 44 may be interpreted as the control system for apparatus repair information, the server 44 and the laser imager 36 may be interpreted as the control system for apparatus repair information, or the whole equipment shown in FIG. 2 may be interpreted as the control system for apparatus repair information. Besides, although it is not described here, an apparatus for medical use such as a laser imager itself may be made also to have a function of the server, that is, an apparatus for medical use such as a laser imager may be the control system for apparatus repair information.

Further, for the transmitting means and the receiving means referred to herein, for example, an analogue modem can be cited. Furthermore, in the case where a wire or wireless digital communication line is used, a signal converting means suitable for the data of each network can be used as the transmitting means and the receiving means. For instance, a network card, a TA, an ATM, a PIAFS, an ASDL and so forth can be used. However, it should not be confined to these.

Further, for the memorizing means referred to herein, for example, a memory, various kinds of RAM's (including a DRAM, an SDRAM, a flash memory, a miniature card, a compact flash, a smart medium, a PC card, and so forth), and a hard disk, or a digital information recording medium such as a CDRW, a CD-R, an MT, a DAT, an FD, an MD, an MO, a DVD and the recording apparatus for them can be used. However, it should not be confined to these. Especially, it is favorable to use a memory, a RAM, or a hard disk. Furthermore, it may be appropriate that the classification of the apparatus into the respective kinds may be carried out by means of a CPU, a DSP, a custom IC or the like. In this case, the memorizing means which classifies and memorizes the information concerning repair of apparatus for each kind of apparatus is interpreted as the combination of the memorizing means shown as examples in the above and a CPU, a DSP, or a custom IC.

Every apparatus has a built-in computer, or is provided with a computer as a signal transmitting means and a signal receiving means.

For instance, when a trouble occurs in the automatic developing apparatus for medical use 30, a serviceman makes repair of the trouble portions, and the information concerning how the automatic developing apparatus for medical use 30 have been repaired is transmitted from the automatic developing apparatus for medical use 30 side to the control system for apparatus repair information through a communication line and is received by the receiving means 1. To state it concretely, the information concerning how in which apparatus, which portions and/or parts have been repaired is transmitted and received.

It is favorable that, in this control system for apparatus repair information, the information concerning repair of apparatus memorized for each kind of apparatus is memorized in the memorizing means 2 in relation to the information concerning the portions and/or the parts of apparatus memorized beforehand for each kind of apparatus. By relating the information concerning repair of apparatus memorized for each kind of apparatus to the information concerning the portions and/or parts of apparatus memorized beforehand for each kind of apparatus, the apparatus repair information can be transmitted to the apparatus side when the portions and/or the parts of an apparatus are about to be repaired.

It is favorable that, from the control system for apparatus repair information, when the portions and/or the parts of an apparatus is about to be repaired, the information concerning repair of apparatus memorized in the memorizing means 2 for each kind of apparatus is transmitted through a communication line by the transmitting means 3 in a condition that it is related to the information concerning the portions and/or the parts of apparatus memorized beforehand for each kind of apparatus.

In this way, by relating the information concerning the repair of apparatus memorized for each kind of apparatus to the information concerning the portions and/or the parts of apparatus memorized beforehand for each kind of apparatus, the troubles which are easy to occur for respective apparatus can be foreseen and it is found out how the repair should be made corresponding to the troubles on the basis of the information concerning how in which apparatus, which portions and/or which parts have been repaired, so that the maintenance and inspection may be carried out quickly and easily.

It is favorable, in transmitting and receiving the information concerning repair of apparatus memorized for each kind of apparatus, to use the information specifying the apparatus, the information specifying the portions of apparatus, and the information specifying the parts of apparatus that are to be commonly used among the apparatus, the PC's, and the control system for apparatus repair information. By doing this, the apparatus repair information is easily related to the information concerning the portions and/or parts of apparatus memorized beforehand in the memorizing means 3 of the control system for apparatus repair information.

In this way, when an apparatus is going to be repaired, by receiving the information concerning repair of a plurality of kinds of apparatus transmitted through a communication line, memorizing this received information concerning repair of a plurality of kinds of apparatus for each kind of apparatus, and transmitting this memorized information concerning repair for each kind of apparatus to the apparatus side through a communication line, the troubles that are easy to occur for respective apparatus can be foreseen, and it is found out how the repair is to be done corresponding to the troubles, because the information concerning repair of apparatus is commonly utilized; hence, the maintenance and inspection can be quickly and easily carried out.

Figure 3:
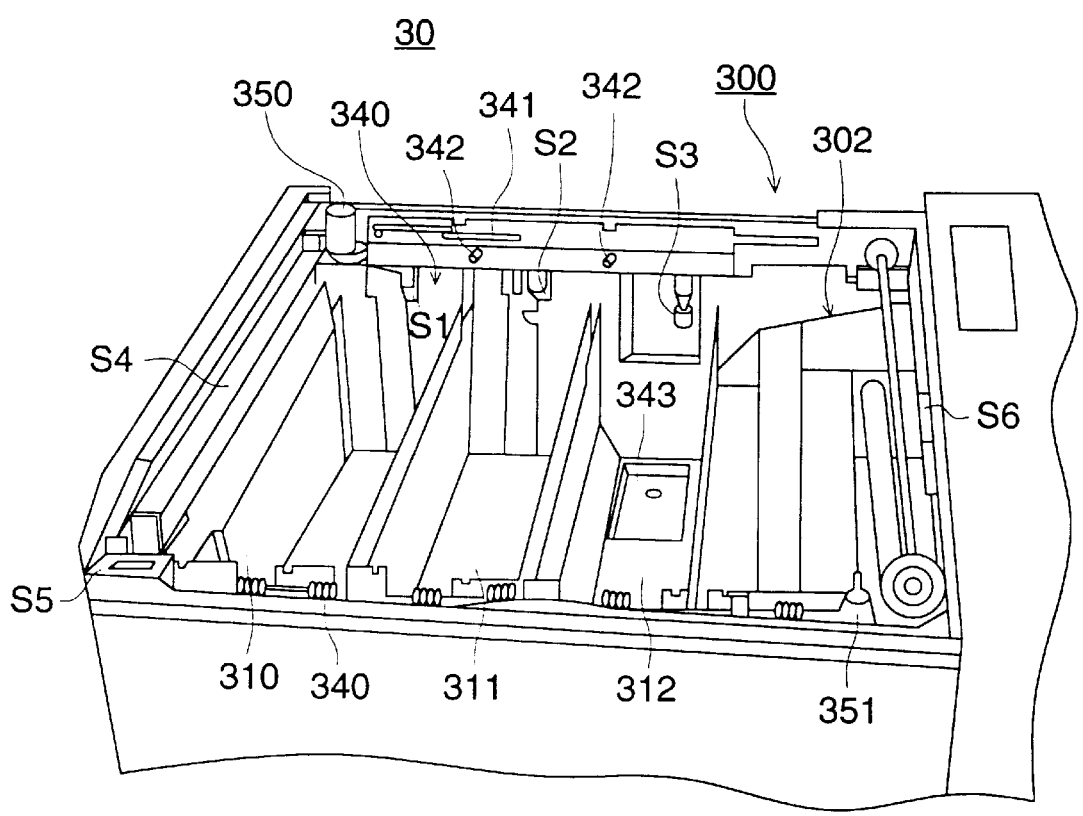
FIG. 3 is a perspective view of the processing tank of an automatic developing apparatus for medical use.
Figure 4:
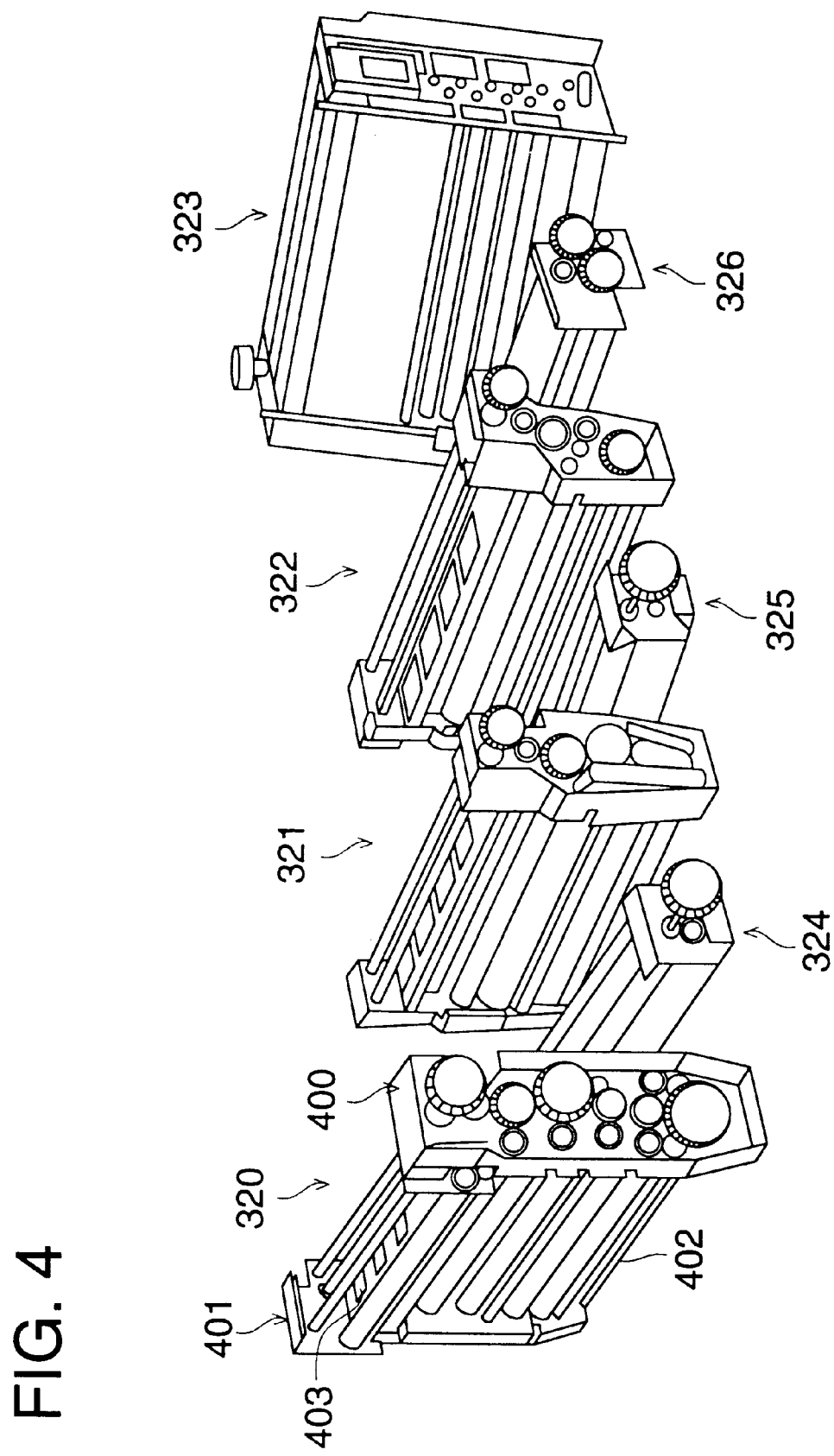
FIG. 4 is a perspective view of every rack of the automatic developing apparatus for medical use.
Figure 5:
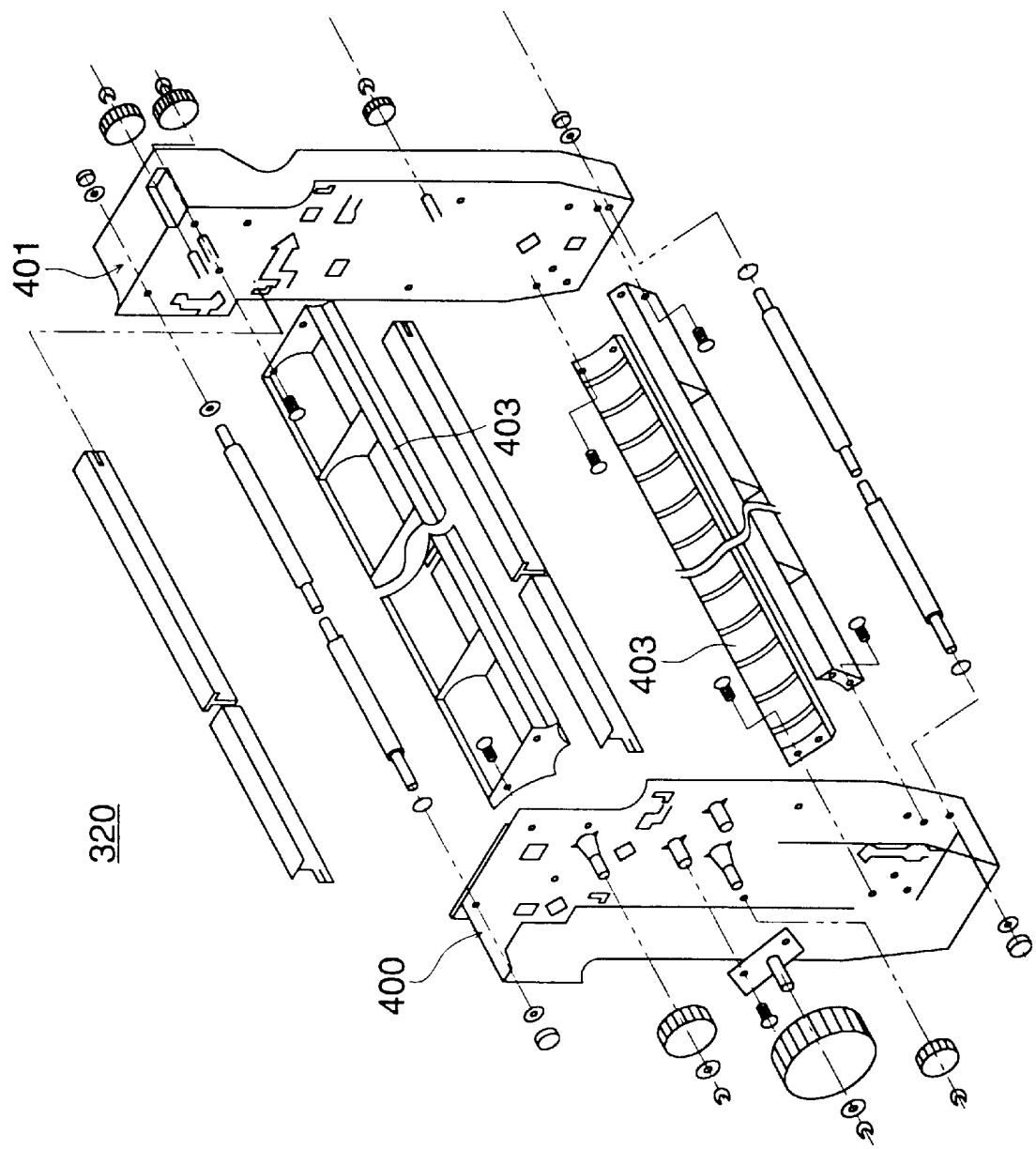
FIG. 5 is a perspective view of the exploded developing rack.
Figure 6:
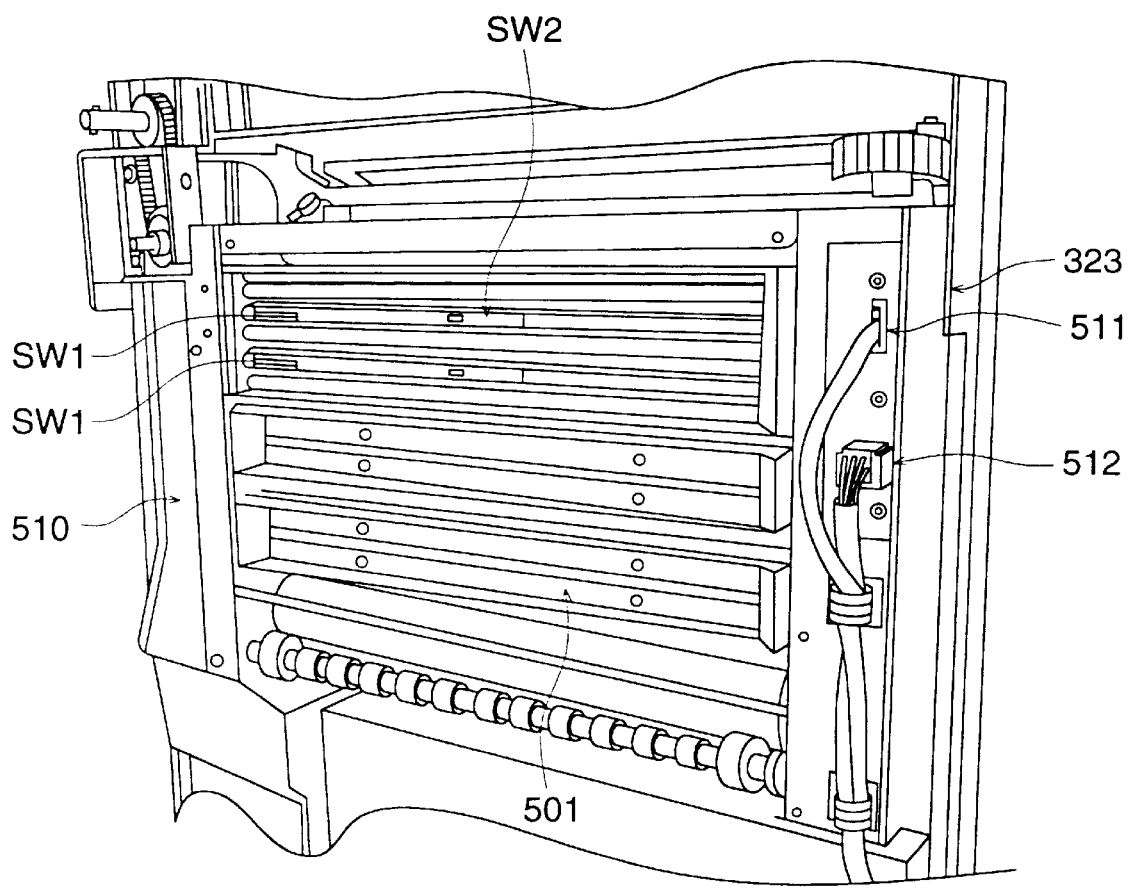
FIG. 6 is a perspective view of the drying portion of the automatic developing apparatus for medical use.
Figure 7:
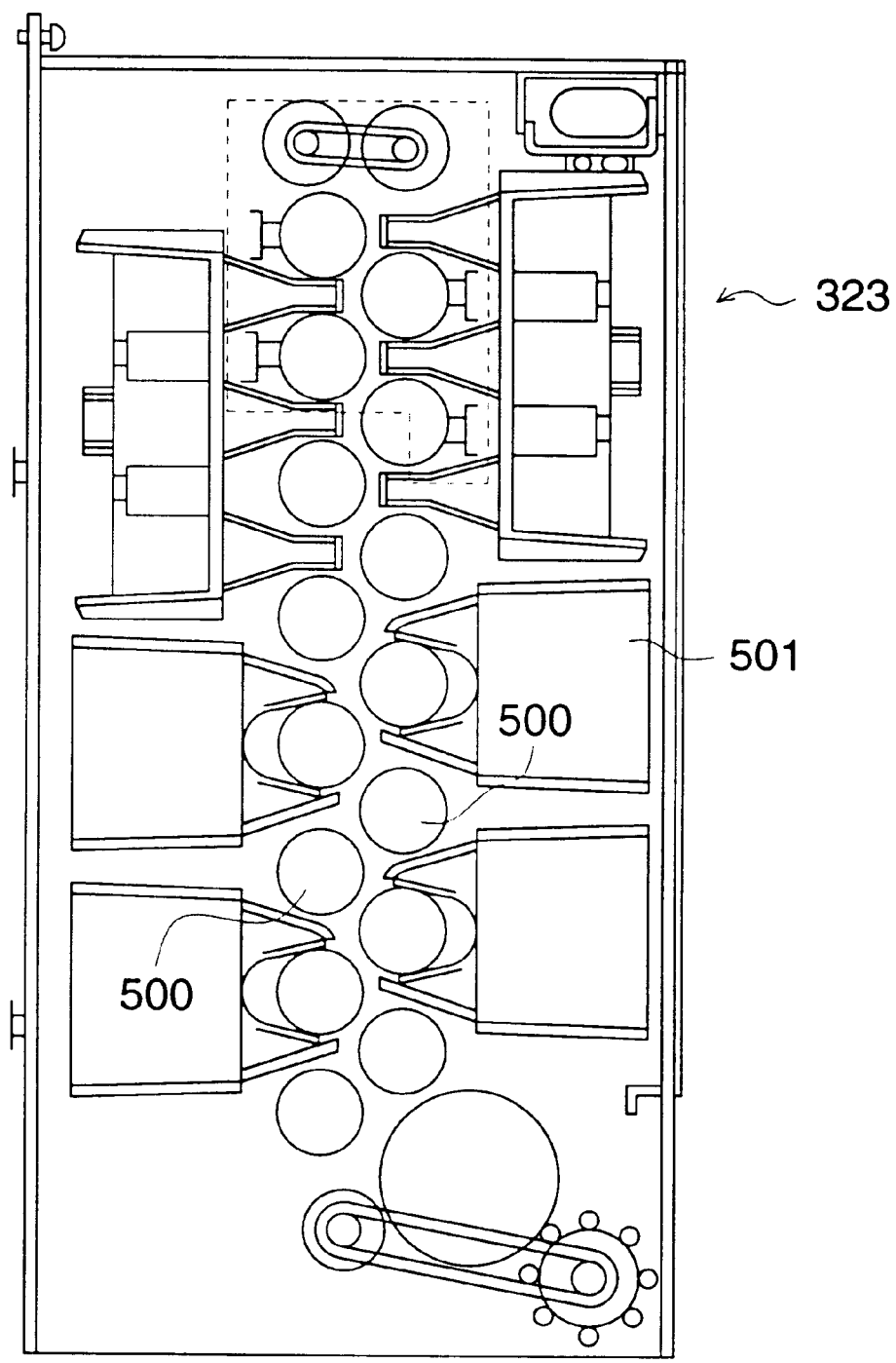
FIG. 7 is a cross-sectional view of the drying portion.
Figure 8:
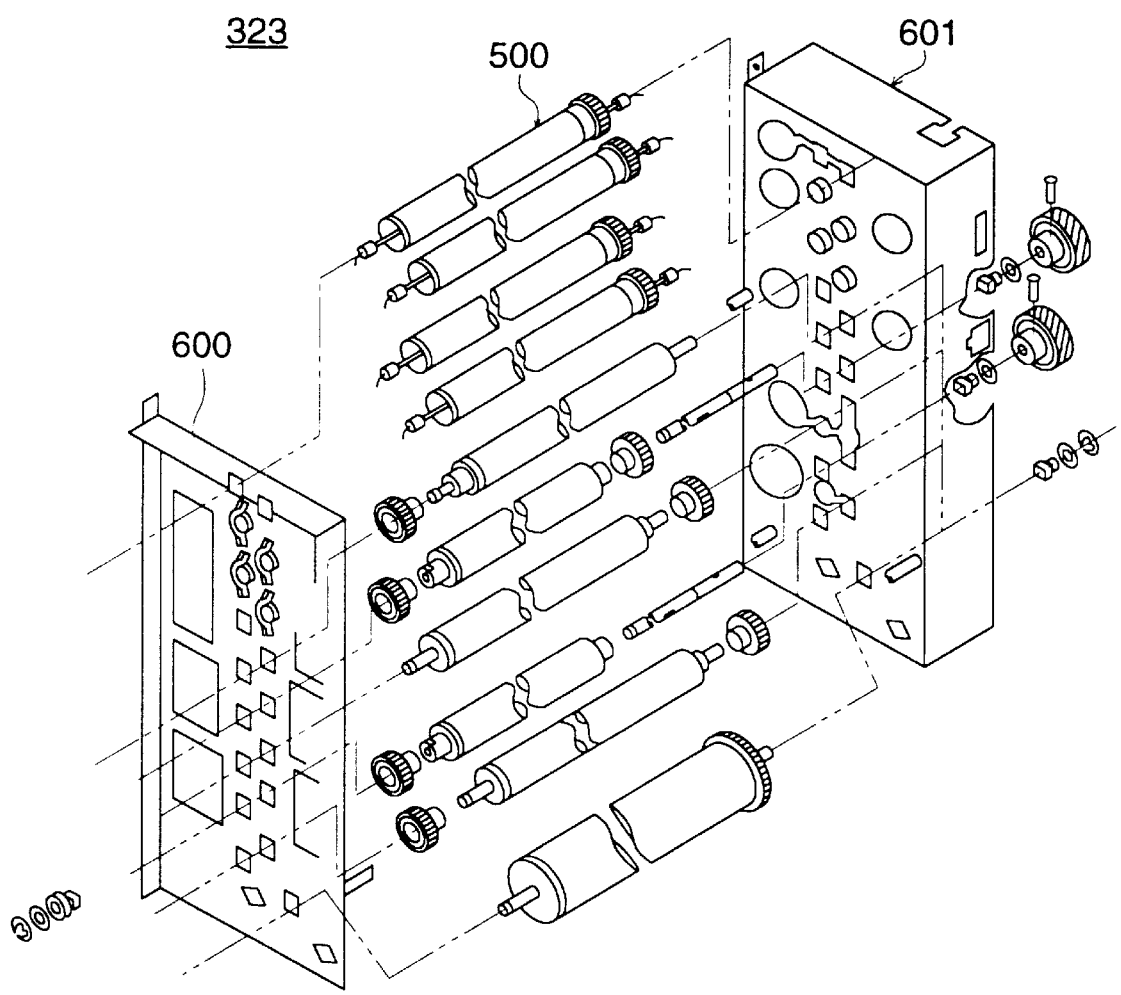
FIG. 8 is a perspective view of the exploded drying portion.
Figure 9:
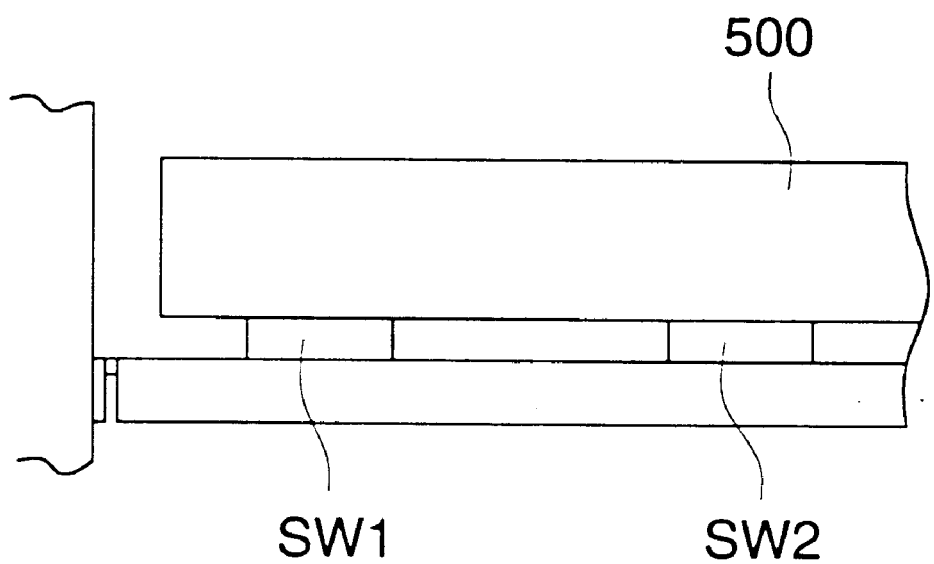
FIG. 9 is a drawing showing the temperature control of the drying portion.

In the following, as an apparatus utilized in the control system for apparatus repair information, a concrete embodiment of an automatic developing apparatus for medical use is shown in FIG. 3 to FIG. 9. FIG. 3 is a perspective view of the processing tank of the automatic developing apparatus for medical use, FIG. 4 is a perspective view of every rack of the automatic developing apparatus for medical use, FIG. 5 is a perspective view of the exploded developing rack, FIG. 6 is a perspective view of the drying portion of the automatic developing apparatus for medical use, FIG. 7 is a cross-sectional view of the drying portion, FIG. 8 is a perspective view of the exploded drying portion, and FIG. 9 is a drawing showing the temperature control portion of the drying portion.

In the mainframe 300 of the automatic developing apparatus for medical use 30, there are provided the processing tank 301 and the drying portion 302, and the processing tank 301 is composed of the developing tank 310, the fixing tank 311, and the water-washing tank 312. In the developing tank 310, the fixing tank 311, and the water-washing tank 312 of the processing tank 310, the developing rack 320, the fixing rack 321, and the water-washing rack 322 which are shown in FIG. 4 are disposed respectively, and in the drying portion 302, the drying rack shown in FIG. 4 is disposed. Further, the developing-and-fixing connecting rack 324 is disposed between the developing rack 320 and the fixing rack 321, and the fixing-and-water-washing connecting rack 325 is disposed between the fixing rack 321 and the water-washing rack 322, and further the squeezing rack 326 is disposed between the water-washing rack 322 and the drying rack 323.

In the apparatus mainframe 300, there is provided the driving worm 340, by which the developing rack 320, the fixing rack 321, and the water-washing rack 322 are driven. In the developing tank 310, there are provided the fixing liquid surface sensor S2 and the developing liquid replenishing pipe 346. In the fixing tank 311, there are provided the fixing liquid surface sensor S2 and the fixing liquid replenishing pipe 341. In the water-washing tank 312, there are provided the washing water surface sensor S3, the washing water supplying pipe 342, and the fur preventing agent 343. Further, in the apparatus mainframe 300, there are disposed the suction opening 350, the film sensor S4, the interlock switches S5 and S6, and the internal piping for exclusive use 351.

The developing rack 320 is made up in such a manner as shown in FIG. 4 and FIG. 5, having a structure such that the transport rollers 402 and the transport guides 403 are supported by the side plates 400 and 401. The fixing rack 321 and the water-washing rack 322 are both made up in the same manner as the developing rack; hence, the detailed drawings are omitted.

The drying rack 323 of the drying portion 302 has the air nozzles 501 disposed at the both sides of the heat rollers 500, and drying air is blown against the photosensitive material from these air nozzles 501. On each of the heat rollers 500, there are provided the over-heat switch SW1 and the heat roller thermistor SW2 as shown in FIG. 6 and FIG. 9. At one side of the drying rack 323, the high pressure duct 510 is disposed, and at the other side of it, the connector for the sensors 511 and the connector for heaters 512 are disposed.

The drying rack 323 is made up in such a manner as shown in FIG. 8, that is, has a structure such that the heat rollers 500 are supported by the side plates 600 and 601; in addition, the air nozzles 501 are omitted in FIG. 8.

The troubles which occur in the automatic developing apparatus shown in FIG. 3 to FIG. 9 are as follows: in this embodiment, an example of something wrong with the processing tank 301 and that with the drying portion 302 will be explained.

'AN EXAMPLE OF SOMETHING WRONG WITH THE PROCESSING TANK 301' Error: E-01 Abnormal developing temperature rise Set condition:

Temperature exceeds the determined temperature +0.3° C. continuously for 10 minutes (in case of change of determined temperature, within an hour)

Cause:

(1) the water supply valve is closed (2) temperature of cooling water is high (3) the electromagnetic valve for cooling and automatic draining does not turn on Reset condition:
Determined temperature +0.3≧ actual temperature
Measures:
(1) Open the water supply valve
(2) Attach a cooling unit
(3) Confirm that the liquid in the water-washing tank is drained by opening the electromagnetic valve in the output test mode No. 13
(4) The LED 9 on the SSR board
On: Check the conduction from the electromagnetic valve for cooling and automatic draining, and check the SSR 9,
Off: Something wrong with the CPU board, or something wrong with the cable to the SSR board.

When a serviceman finishes the repair, he transmits the information concerning the repair from the automatic developing apparatus for medical use side; further, in the control system for apparatus repair information, it is received and memorized in the memorizing means 2 in relation to the information concerning, for example, the processing tank as the portion of apparatus, that, in case of the abnormal developing temperature rise, if the cause is, for example, (2) that the temperature of the cooling water is high, a cooling unit is attached as the measure (2).

In this kind of automatic developing apparatus for medical use, an abnormal developing temperature rise occurs as described in the above; a serviceman receives the information concerning repair for each kind of apparatus memorized in the receiving means from the control system for apparatus repair information through a communication line, in a condition that it is related to the information concerning the portions of apparatus memorized beforehand for each kind of apparatus. From this received information, if it is found out that, in this kind of automatic developing apparatus for medical use, in the processing portion for example, it is often the case that the cause of the trouble is that (2) the temperature of cooling water is high, the serviceman first carries out the measure (2) attaching a cooling unit, and if the developing temperature rise disappears, the repair has been finished; thus, the maintenance and inspection can be carried out quickly and easily.

When this repair is finished, it is transmitted to the control system for apparatus repair information, the information that, in the automatic developing apparatus for medical use, in the case where abnormal developing temperature rise has occurred in the processing tank, repair has been made by attaching a cooling unit. In the control system for apparatus repair information, this transmitted information is memorized in the memorizing means 2 as the information concerning repair of apparatus to be memorized for each kind of apparatus in the case of this kind of automatic developing apparatus for medical use, in relation to the information concerning the portion of apparatus, i.e., the processing tank and the parts related to the abnormal developing temperature rise.

'AN EXAMPLE OF SOMETHING WRONG WITH THE DRYING PORTION' Error: E-12 trouble in the thermistor for warm air drying
Set conditions:
Trouble signal of the thermistor for warm air drying turns on
Heater for warm air drying turns off
Cause:
(1) JP11 of the CPU board or JP 83 of the temperature control board is disengaged or the lead wire is cut off
(2) Thermistor for warm air drying is wrong Reset condition:
Trouble signal of the thermistor for warm air drying turns off
Measures:
(1) Insert the connector
(2) Check the conduction between JP11 of the CPU board and JP 83 of the temperature control board
(3) Check the conduction of the lead wire to the thermistor for warm air drying:

In case of resistance equal to or higher than 38 KΩ, the sensor is wrong,

In case of resistance lower than that, the temperature control board is wrong.

When a serviceman finishes the repair, he transmits the information concerning the repair from the automatic developing apparatus for medical use side; further, in the control system for apparatus repair information, it is received and memorized in the memorizing means 2 in relation to the information concerning, for example, the thermistor for warm air drying as the parts in the drying portion of the apparatus, that, in case of the trouble of the thermistor for warm air drying, for example, (2) the thermistor for warm air drying is wrong as the cause, and (2) the conduction between the JP11 of the CPU board and the JP83 of the temperature control board is checked as the measure.

In this kind of automatic developing apparatus for medical use, a trouble of the thermistor for warm air drying occurs as described in the above; a serviceman receives the information concerning repair for each kind of apparatus memorized in the receiving means from the control system for apparatus repair information through a communication line, in a condition that it is related to the information concerning the portions of apparatus memorized beforehand for each kind of apparatus. From this received information, if it is found out that, in this kind of automatic developing apparatus for medical use, it is often the case that the cause of the trouble is that, as the parts in the drying portion for example, (2) the thermistor for warm air drying is wrong, the serviceman first carries out the measure (3) checking the conduction of the lead wire to the thermistor for warm air drying, and judges that the sensor is wrong or the temperature control board is wrong according as the resistance is not lower than 38 KΩ or it is lower than that, doing the measure, and when the thermistor for warm air drying becomes normal, the repair has been finished; thus, the maintenance and inspection can be carried out quickly and easily.

When this repair is finished, it is transmitted to the control system for apparatus repair information, the information that, in the automatic developing apparatus for medical use, in the case where a trouble of the thermistor for warm air drying in the drying portion has occurred, repair has been made by (3) checking the conduction of the lead wire to the thermistor for warm air drying and making the measure through judging that the sensor is wrong or the temperature control board is wrong according as the resistance is not lower than 38 KΩ or it is lower than that. In the control system for apparatus repair information, this transmitted information is memorized in the memorizing means 2 as the information concerning repair of apparatus to be memorized for each kind of apparatus in the case of this kind of automatic developing apparatus for medical use, in relation to the information concerning the portion of apparatus, i.e., the drying portion and the parts of the thermistor for warm air drying.

The embodiment of the invention which has been explained up to now is the one showing the case where the information concerning repair of apparatus contains information concerning a machine to be repaired (the kind of the repaired apparatus), the information on the portion and/or the part of the apparatus which has required repair (the kind of the repaired portion and/or the part), the counter measure information (the information concerning by what kind of measures the repair has been made), and the trouble information (the kind of the trouble or abnormality and/or the kind of the cause of the trouble or abnormality). Further, it is the embodiment wherein an apparatus for medical service is used as the apparatus.

In other words, after an apparatus has been repaired, the above-mentioned information concerning repair of the apparatus is transmitted through being inputted by a person from the inputting means of the control system for apparatus repair information, that is, the inputting means such as the keyboard or the buttons of the apparatus for medical service, the keyboard of the personal computer, or the portable information terminal. Further, it may be appropriate that, when the apparatus for medical service has been repaired, the apparatus for medical service automatically discriminates the portion repaired and automatically transmits the information concerning the repair of the apparatus for medical service.

Then, the receiving means of the server, which is the control apparatus or system for apparatus repair information receives those bits of information, and they are classified into the respective kinds of apparatus and memorized in the memorizing means as some bits of the information concerning repair of a plurality of apparatus, on the basis of the information on the apparatus which has required repair.

Further, when an apparatus for medical service has got out of order, through inputting by a person that the information concerning repair of apparatus is required from the inputting means such as the keyboard or the buttons of the apparatus having a trouble, the keyboard of the personal computer, the portable information terminal, or the like, the information concerning repair of apparatus corresponding to the apparatus for medical service having a trouble memorized in the memorizing means of the server is read and transmitted by the transmitting means of the server. Thus, the information concerning repair of apparatus such as the information on the trouble and the information on the measures is displayed on the outputting means of the control system for apparatus repair information, that is, the monitor of the apparatus for medical service, the personal computer, or the potable information terminal, and the person who makes the repair can carry out it on the basis of the information displayed.

By doing this, the information concerning repair of apparatus is added from time to time, and the experiences of repair can be made to be commonly utilized, so that even a person who is not familiar with the apparatus can exactly repair the apparatus. Further, the measures to be done can be determined quickly on the spot of repair of the apparatus. Therefore, time and cost is reduced to a large extent. Moreover, by accumulating the information concerning the kinds and the portions of the apparatus that have had a trouble, the kinds of the troubles, and so forth, the information concerning which apparatus is easy to get out of order, and which portion of which apparatus is easy to get out of order can be known statistically; hence, the points causing trouble in respective apparatus can be promptly found out.

Furthermore, it may be appropriate that the apparatus that has got out of order automatically recognizes the trouble and transmits the information that the apparatus has got out of order, the information on the apparatus which has required repair, the information on the trouble, and so forth to the server, and the receiving means of the server receives them, and the information on the measures etc. corresponding to said apparatus are read from the memorizing means and transmitted from the transmitting means to said apparatus having the trouble and other apparatus such as the personal computer. In that case also, the information on the apparatus which has required repair, the information on the trouble, and so forth that have been received are classified into those bits of information for respective apparatus and memorized by the memorizing means.

Further, as another example of the embodiment, it is considered the case, for example, where the control system for apparatus repair information comprises at least a server 44 and a laser imager 36 which has a function of a network. The network 45 having a laser imager 36 at its center often stops wholly when one of the apparatus for medical service (a CT scan apparatus for example) has got out of order. In such a case, the apparatus that has got out of order must be promptly recognized. First, the apparatus that has got out of order (the CT scan apparatus 42) transmits the information concerning repair of apparatus including the information on the apparatus which has required repair, and the receiving means of the control system for apparatus repair information, that is, the receiving means of the laser imager 36 receives the information concerning repair of apparatus including the information on the apparatus which has required repair. Then, the name of the apparatus that has got out of order is displayed on the outputting means of the control system for apparatus repair information, that is, the liquid crystal panel of the laser imager 36 on the basis of the information on the apparatus which has required repair received by the receiving means. Owing to this, the apparatus that has got out of order (the CT scan apparatus) can be promptly recognized and it becomes possible to restore the network 45 quickly. Further, at the same time of the above-mentioned operation, the laser imager 36 transmits the information concerning repair of apparatus from the transmitting means of the laser imager 36, and the receiving means of the server 44 receives it and the information concerning the repair of the apparatus is classified into the corresponding kind of the apparatus and memorized in the memorizing means of the server 44.

Further, in the case also where the control system for apparatus repair information is composed of the server 44 and the personal computer 38 or the portable information terminal, the similar operation can be performed. For example, the receiving means of the server 44 receives the information concerning repair of apparatus including the information on the apparatus which has required repair. Then, it transmits the information to the personal computer 38 or the portable information terminal 37, and the name of the apparatus that has got out of order is displayed on the outputting means of the personal computer 38 or the portable information terminal 37, that is, the monitor of the personal computer 38 or the portable information terminal 37, on the basis of the information on the apparatus which has required repair received by the receiving means.

As the way of outputting, it may be appropriate to display the name of the apparatus which has required repair on the monitor or the liquid crystal panel, or to print out the name of the apparatus which has required repair by a printer. Of course, any way of outputting may be used that can make the apparatus which has required repair be recognized.

Furthermore, as another embodiment of the invention, it will be explained in the following the case where a repair program is handled for the information concerning repair of apparatus. For example, in the case where the software has got out of order in the laser imager 34 in FIG. 2, the information concerning repair of apparatus such as the information that the apparatus has got out of order, the information on the apparatus which has required repair, the information on the trouble is transmitted to the server 44, automatically from the laser imager 34, or by a person from the personal computer 38 or the portable information terminal 37. The server 44 has a repair program for restoring or exchanging the software memorized in the memorizing means. Then, when the receiving means of the server 44 receives the information concerning repair of apparatus, the repair program corresponding to it is read out from the memorizing means and is transmitted from the transmitting means of the server 44 to the laser imager 34. Thus, owing to the repair program, the software of the laser imager 34 that has got out of order is automatically restored. Further, the received information concerning repair of apparatus is classified into the corresponding kind of the apparatus and is memorized in the memorizing means of the server 44.

As has been described in the foregoing, according to the invention set forth in the aforesaid paragraph (1), by receiving the information concerning repair of a plurality of kinds of apparatus transmitted through a communication line, memorizing this received information concerning repair of a plurality of kinds of apparatus for each kind of apparatus, and transmitting said memorized information concerning repair for each kind of apparatus through a communication line, the troubles which are easy to occur in respective apparatus can be foreseen, and it can be found out how the repair is to be done corresponding to the troubles, because the information concerning repair of apparatus is commonly utilized when repair of apparatus is made; hence, the maintenance and inspection can be quickly and easily carried out.

According to the invention set forth in the aforesaid paragraph (2), by relating the information concerning the repair of apparatus memorized for each kind of apparatus to the information concerning the portions and/or the parts of apparatus memorized beforehand for each kind of apparatus, the troubles which are easy to occur for respective apparatus can be foreseen and it is found out how the repair should be made corresponding to the troubles on the basis of the information concerning how in which apparatus, which portions and/or which parts have been repaired; hence, the maintenance and inspection can be carried out quickly and easily.

According to the invention set forth in the aforesaid paragraph (3), when the repair of the portion and/or the parts of an apparatus is going to be done, the apparatus repair information can be transmitted to the apparatus side, in a condition that the information concerning repair of apparatus memorized for each kind of apparatus is related to the information concerning the portions and/or the parts of apparatus memorized beforehand for each kind of apparatus.

Further, a control program, which is installed in a server or the like, for controlling the information concerning repair of apparatus recorded in a recording medium such as a CD-ROM, a CD-RW, a CD-R, an MT, a DAT, an FD, an MD, an MO, and a DVD can be used as a control apparatus or system for apparatus repair information controlling the information concerning repair of apparatus.

In addition, the control program for apparatus repair information controlling the information concerning repair of apparatus has a function to make the receiving means of the server receive the information concerning repair of apparatus, to make the memorizing means classify and memorize for each kind of apparatus the information concerning repair of apparatus received by the receiving means, and to make the transmitting means transmit the information concerning repair for each kind of apparatus memorized in the memorizing means.

The disclosed embodiment can be varied by a skilled person without departing from the spirit and scope of the invention.

What is claimed is:

1. A medical machine repair information administrating system for administrating trouble information involved in an operation of medical machines, comprising:

an administrating center comprising:
  a central communicating device to receive trouble information and to transmit counter measure information; and
  a memory to store the counter measure information which includes possible causes of troubles of medical machines and counter measures correlated with the possible causes; and
  a first local apparatus installed in a first hospital remote from the administrating center and comprising:
  a first medical machine to conduct a medical operation; and
  a first local communicating device to transmit trouble information regarding the first medical machine to the administering center and to receive the counter measure information from the administrating center; and a second local apparatus installed in a second hospital remote from the administrating center and comprising:
  a second medical machine being the same type of the first medicl machine and to conduc the same medical operation as the first medical machine;

a second local communicating device to transmit trouble information regarding the second medical machine to the administrating center and to receive the counter measure information from the adminstrating center;

wherein when the first local communicating device transmits trouble information reporting a trouble involved in an operation of the first medical machine, a cause of the trouble an an actual counter measure having taken to repair the trouble to the administrating center, the adminstrating center renews the counter measure informatioin stored in the memory so as to include the cause of the trouble and the actual counter measure taken in the first medical machine;

wherein the second local communicating device transmits trouble information reporting a trouble involved in an operation of the second medical machine to the administrating center, the second local communicating device receives the renewed counter measure information from the adminstrating center, and wherein the renewed counter measure information includes the counter measure taken for the first medical machine.

2. The medical machine report information administrating system of claim 1, wherein the first and second medical machines comprise plural parts and the memory stores possible causes of possible troubles for each of the plural parts.

3. The medical machine repair information adminstrating system of claim 1, wherein the adminstrating center administrates plural different types of medical machines and wherein the memory stores possible causes of possible troubles and counter measures correlated with the possible causes for each type of medical machines.

4. The medical machine repair information adminstrating system of claim 1, wherein the memory comprises a repairing program for the first and second medical machines and the central communicating device transmits the repairing program to the first and second local apparatus.

5. The medical machine repair information administrating system for administering trouble information involved in an operating of medical machines, comprising:

an adminstrating center comprising:

a central communicating device to receive trouble information and to transmit counter measure information; and a memory to store counter measure information which includes possible causes of troubles of medical machines and counter measures correlated with said possible causes; and a first local apparatus installed in a first hospital remote from the administrating center and having a first medical machine to conduct a medical operation;

a second local apparatus installed in a second hospital remote from the adminstrating center and having a second medical machine which is the same type of the first medical machine and conducts a medical operation;

a portable communicating device conveyable to the first local apparatus or the second local apparatus and the portable communicating device to transmit trouble information to the adminstrating center and to receive the counter measure information from the adminstrating center;

wherein when the portable communicating device transmits trouble information reporting a trouble involved in an operation of the first medical machine, a cause of the trouble and an actual counter measure having taken to repair the trouble to the administrating center, the administrating center renews the counter measure information stored in the memory so as to include the cause of the trouble and the actual counter measure taken in the first medical machine;

wherein when the portable communicating device transmits trouble information reporting a trouble involved in an operation of the second medical machine to the adminstrating center, the portable communicating device receives the renewed counter measure information from the adminstrating center; and wherein the renewed counter measure information includes the counter measure taken for the first medical machine.

6. The medical machine repair information system of claim 1, wherein the first and second medical machines are at least one of a laser imager for medical use, an automatic developing apparatus for medical use, a CT scan apparatus, an MRI apparatus, and a digital radiography apparatus.

* * * * *